(No Model.)

T. D. BRADY.
ROD PACKING.

No. 583,451. Patented June 1, 1897.

Witnesses
Edward A. Lawrence
M. W. Caskey.

Inventor
Thomas D. Brady,
by Wm. L. Pierce,
his Attorney

UNITED STATES PATENT OFFICE.

THOMAS D. BRADY, OF MILLTOWN, PENNSYLVANIA, ASSIGNOR OF ONE-HALF TO ROBERT S. DUFFIELD, OF PITTSBURG, PENNSYLVANIA.

ROD-PACKING.

SPECIFICATION forming part of Letters Patent No. 583,451, dated June 1, 1897.

Application filed February 17, 1896. Serial No. 579,485. (No model.)

*To all whom it may concern:*

Be it known that I, THOMAS D. BRADY, a citizen of the United States, residing at Milltown, in the county of Allegheny and State of Pennsylvania, have invented or discovered a new and useful Improvement in Rod-Packings, of which the following is a specification.

Figure 1:
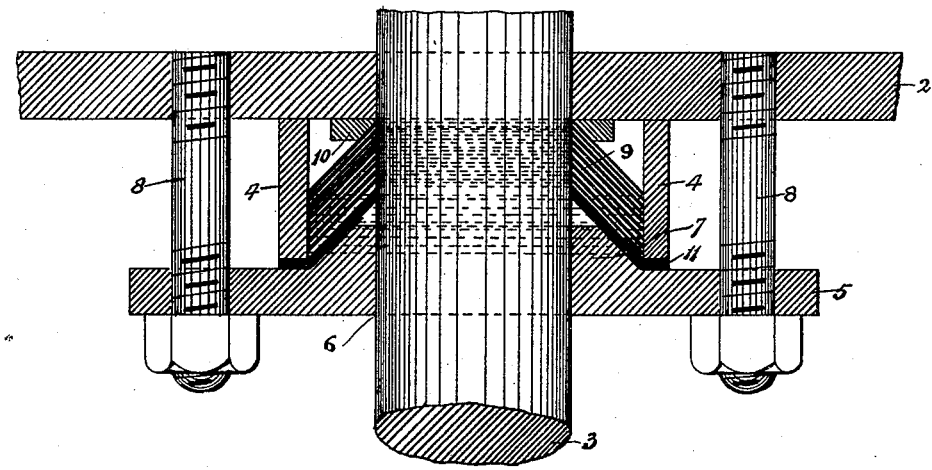
Figure 2:
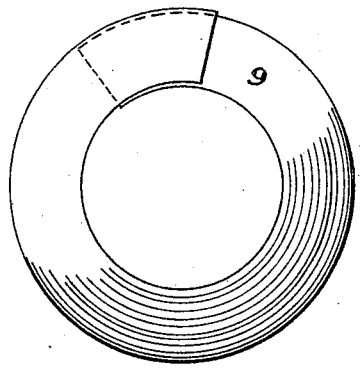
Figure 3:
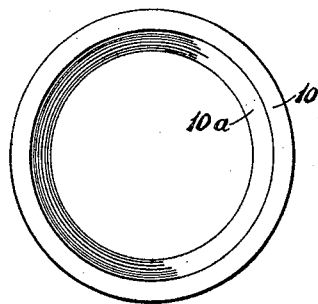
Figure 4:
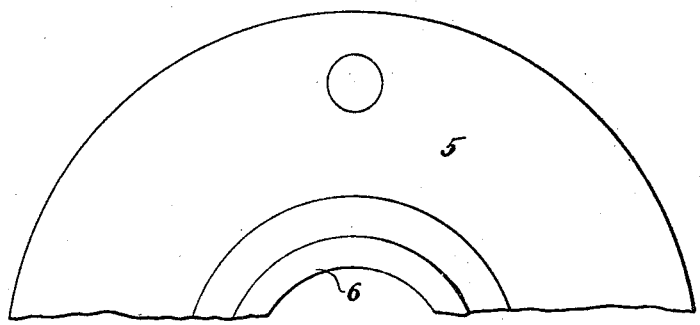
Figure 5:
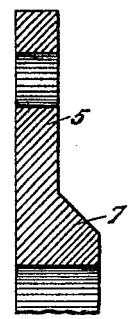

In the accompanying drawings, which make part of this specification, Figure 1 is a part section and part elevation of my invention applied to the piston of a steam-engine. Fig. 2 is a plan of one of the packing-rings. Fig. 3 is a plan of the seating-ring against which the packing-rings are drawn. Fig. 4 is a broken plan of the stuffing-box cover or gland, and Fig. 5 is a partial cross-section of the same.

The primary purpose of my invention, generally stated, is a packing for piston and like rods, consisting of a plurality of thin split rings set obliquely against the piston or other rod.

The subordinate purpose of my invention, generally stated, is the means whereby such rings are held in operative position.

I have illustrated my invention as applied to the piston-rod of a steam-cylinder, but it is applicable to all stuffing-boxes and to slide-valve rods, regulator-rods, pump-plungers of every description, and analogous reciprocating devices.

The difficulties in maintaining a permanent and tight joint in stuffing-boxes are too well known to require extended explanation. I largely overcome these difficulties by the use of split metallic rings.

In the accompanying drawings, which make part of this specification, 2 is the head of a steam-cylinder, and 3 the piston-rod moving therethrough.

4 is a ring which constitutes a stuffing-box.

5 is the cover of the stuffing-box, perforated at 6 for the passage of the piston-rod and provided around the piston-rod with a circumferential tapering inwardly-projecting shoulder 7. The cover 5 is drawn down by bolts 8 8.

9 9 are split rings, preferably with ends overlapping, and should be about one thirty-second of an inch thick, although this may be varied. These rings may be stamped out or made in any desired manner and of any suitable material, although I believe brass to be the best.

10 is a seating-ring for the inner split rings. Its inner periphery is beveled at 10$^a$ to correspond with the angle at which the rings are presented to the piston-rod.

11 is a packing-ring, of rubber or like material, placed over the split ring and between the stuffing-box and its cover to catch any leakage passing the split rings. In the majority of cases it may be omitted as unnecessary.

When so desired, the edges of the rings which are next the rod may be beveled off at an angle to fit their inclination to the rod, but they will wear to this angle after a brief period of use even if left square.

I find in actual operation that this ring-packing is both durable and efficient, and as the rings are split they readily accommodate themselves to the movements of the rod, the ring slightly spreading or contracting, while the overlapping ends of the rings always secure a complete circle of packing around the rod.

It will be seen that the packing is held in position against the rod entirely by the pressure, and as the pressure varies the pressure of the packing on the rod will vary.

When, for instance, the cylinder is taking steam at one end, the pressure at that end will be the maximum and hold the rings closely against the rod, while the pressure at the other end will be slight, thus reducing greatly the friction on the rod at that point.

I claim—

1. The combination of a stuffing-box, and a plurality of flat split rings in said box set parallel with each other and obliquely to the moving rod and seated against the same solely by the pressure of the steam, air, or gas, &c., in direct contact with said rings.

2. The combination of a ring forming the shell of a stuffing-box; a plurality of spring packing-rings set in said box obliquely to the moving rod and seated against the same solely by the pressure of the steam, air or gas, &c., in direct contact with said rings; a ring at the base of the box and a gland at its outer end between which the rings are held in place.

In testimony whereof I have hereunto set my hand this 12th day of February, A. D. 1896.

THOMAS D. BRADY.

Witnesses:
WM. L. PIERCE,
EDWARD A. LAURENCE.